United States Patent
Yun et al.

(10) Patent No.: US 12,525,983 B2
(45) Date of Patent: Jan. 13, 2026

(54) SIGNAL FOLDING METHOD AND DEVICE

(71) Applicant: Huawei Technologies Co., Ltd., Shenzhen (CN)

(72) Inventors: Zhiqiang Yun, Shenzhen (CN); Xiaowen Dong, Shenzhen (CN); Jinfeng Mu, Shenzhen (CN); Xu Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 18/167,594

(22) Filed: Feb. 10, 2023

(65) Prior Publication Data
US 2023/0188148 A1 Jun. 15, 2023

Related U.S. Application Data

(63) Continuation of application No. PCT/CN2021/074697, filed on Feb. 1, 2021.

(30) Foreign Application Priority Data

Aug. 13, 2020 (CN) .......................... 202010814282.4

(51) Int. Cl.
*H03M 1/00* (2006.01)
*H03M 1/08* (2006.01)

(52) U.S. Cl.
CPC .................................... *H03M 1/08* (2013.01)

(58) Field of Classification Search
CPC ...... H03M 1/121; H03M 1/1245; H03M 3/43; H03M 1/1215; H03M 1/361; H03M 1/46;
(Continued)

(56) References Cited

U.S. PATENT DOCUMENTS 4,601,027 A * 7/1986 Scarr .................. H04Q 11/0001
359/287
6,181,450 B1 * 1/2001 Dishman .............. H04B 10/118
398/79
(Continued)

FOREIGN PATENT DOCUMENTS

EP 0985955 A1 3/2000
WO WO-2012049680 A1 * 4/2012 ............. G01R 23/17

OTHER PUBLICATIONS

Walt Kester, "ADC Architectures VI: Folding ADCs", MT-025 Tutorial, 2014, 12 pages.
(Continued)

*Primary Examiner* — Linh V Nguyen
(74) *Attorney, Agent, or Firm* — Conley Rose, P.C.

(57) ABSTRACT

A signal folding device receives an input signal, and performs frequency modulation on a plurality of first analog signals based on the input signal to obtain a plurality of modulated first analog signals, where a frequency difference between two adjacent first analog signals in the plurality of modulated first analog signals is the same. The signal folding device may filter the plurality of modulated first analog signals based on a specified bandwidth to obtain a second analog signal, and demodulate the second analog signal to obtain an output signal. The output signal is a folded signal of the input signal within a target amplitude, and the second analog signal is an analog signal within the bandwidth.

20 Claims, 4 Drawing Sheets

(58) Field of Classification Search
CPC .... H03M 3/424; H03M 1/002; H03M 1/0609; H03M 1/0626; H03M 1/0629; H03M 1/08; H03M 1/0836; H03M 1/0854; H03M 1/1205; H03M 1/122; H03M 1/123; H03M 1/126; H03M 1/1285; H03M 1/141; H03M 1/145; H03M 1/146; H03M 1/168; H03M 1/181; H03M 1/205; H03M 1/74; H03M 13/09; H03M 13/1102; H03M 13/23; H03M 13/618; H03M 13/6362; H03M 13/6513; H03M 13/6516; H03M 13/6527; H03M 3/38; H03M 3/402; H03M 3/414; H03M 3/434; H03M 3/436; H03M 3/45; H03M 3/452; H03M 3/454; H03M 3/456; H03M 3/468; H03M 3/496; H03M 9/00; G02F 7/00; G02F 1/291; G02F 1/292; G02F 1/3519; G02F 2/006; G02F 3/00; H04J 14/0298; H04J 14/0282; H04J 14/0227; H04J 14/0305; H04J 14/0224; H04J 14/0226; H04J 14/0232; H04J 14/0246; H04J 4/005; H04J 13/004; H04J 14/02; H04J 14/0201; H04J 14/0228; H04J 14/0238; H04J 14/0241; H04J 14/0247; H04J 14/025; H04J 14/0252; H04J 14/0258; H04J 14/0267; H04J 14/0283; H04J 14/0286; H04J 14/0295; H04J 14/0297; H04J 14/0307; H04J 2014/0253; H04J 3/1629; H04J 3/1647; H04B 10/07957; H04B 10/118; H04B 10/25752; H04B 10/548; H04B 1/0483; H04B 10/07955; H04B 10/2575; H04B 10/40; H04B 10/50; H04B 10/505; H04B 10/506; H04B 10/516; H04B 10/61; H04B 10/616; H04B 2210/006; H04B 1/0025; H04B 1/0067; H04B 1/1036; H04B 1/123; H04B 1/1638; H04B 1/18; H04B 1/28; H04B 1/406; H04B 1/707; H04B 1/7073; H04B 1/7136; H04B 1/7174; H04B 10/00; H04B 10/032; H04B 10/0775; H04B 10/1149; H04B 10/25753; H04B 10/2589; H04B 10/293; H04B 10/299; H04B 10/508; H04B 10/524; H04B 10/532; H04B 10/5561; H04B 10/572; H04B 10/60; H04B 10/612; H04B 10/614; H04B 10/6161; H04B 10/6162; H04B 10/63; H04B 10/64; H04B 10/65; H04B 10/67; H04B 10/69; H04B 10/697; H04B 10/6971; H04B 2210/075; H04B 7/18513; H04B 7/18515; H04B 7/18521; H04B 7/2125
USPC .................................. 341/144, 155, 61, 137
See application file for complete search history.

(56) References Cited

U.S. PATENT DOCUMENTS

| | | | | |
|---|---|---|---|---|
| 6,222,658 | B1* | 4/2001 | Dishman | H04B 10/118 455/12.1 |
| 6,333,807 | B1* | 12/2001 | Hatayama | H04B 10/296 385/39 |
| 6,469,649 | B1* | 10/2002 | Helkey | H03M 1/1245 341/143 |
| 6,888,482 | B1* | 5/2005 | Hertle | H03M 1/1014 341/120 |
| 8,611,759 | B1* | 12/2013 | Kvavle | H04J 14/0305 398/115 |
| 9,021,341 | B1* | 4/2015 | Srinivasa | H04L 1/0033 714/790 |
| 9,461,751 | B2* | 10/2016 | Harley | H04B 10/505 |
| 9,485,554 | B1* | 11/2016 | Kim | H04J 14/0258 |
| 9,625,351 | B2* | 4/2017 | Ataie | G01M 11/338 |
| 2003/0025913 | A1* | 2/2003 | Izatt | G01B 9/0201 356/497 |
| 2013/0315597 | A1* | 11/2013 | Shaver | H04B 10/69 398/79 |
| 2019/0149191 | A1 | 5/2019 | Shmel et al. | |
| 2020/0280164 | A1* | 9/2020 | Almeida | H01S 3/0816 |
| 2023/0052690 | A1* | 2/2023 | Tsuchida | G01S 17/58 |
| 2023/0086455 | A1* | 3/2023 | Liu | H04B 10/293 |

OTHER PUBLICATIONS

Adithya Krishna et al., "Unlimited Dynamic Range ADC, UDR-ADC", Nov. 21, 2019, 11 pages.

B.D.Smith, "An Unusual Electronic Analog-Digital Conversion Method", in IRE Transactions on Instrumentation, vol. PGI-5, Jun. 1956, 6 pages.

* cited by examiner

SIGNAL FOLDING METHOD AND DEVICE

CROSS-REFERENCE TO RELATED APPLICATIONS

This is a continuation of International Patent Application No. PCT/CN2021/074697 filed on Feb. 1, 2021, which claims priority to Chinese Patent Application No. 202010814282.4 filed on Aug. 13, 2020. The disclosures of the aforementioned applications are hereby incorporated by reference in their entireties.

TECHNICAL FIELD

This disclosure relates to the field of communications technologies, and in particular, to a signal folding method and device.

BACKGROUND

Signal sampling refers to converting continuous analog signals in a temporal or spatial dimension into discrete digital signals in the temporal or spatial dimension. An analog-to-digital converter (ADC) can implement the signal sampling to implement conversion between the analog signals and the digital signals.

When an amplitude of an analog signal exceeds an upper limit of an amplitude of a signal that can be received by the ADC or is lower than a lower limit of the amplitude of the signal that can be received by the ADC, a part, of the analog signal, whose amplitude exceeds the upper limit or is lower than the lower limit is weakened (which may also be referred to as a clipping phenomenon) when the ADC performs analog-to-digital conversion. Consequently, the analog signal generates signal distortion, and a digital signal generated through conversion also loses some important information due to the clipping phenomenon.

To resolve this problem, a signal folding manner is proposed. Signal folding means that a modulo operation is performed on a signal, to fold a signal with a relatively large amplitude range into a signal with a relatively small amplitude range. For example, a part, of the signal, whose amplitude exceeds an upper amplitude limit may be moved down, and a part, of the signal, whose amplitude that is lower than a lower amplitude limit may be moved up.

An unlimited dynamic range analog-to-digital converter (UDR-ADC) is currently a main manner of implementing the signal folding. The UDR-ADC can implement the signal folding in an analog-to-digital conversion process, and ensure accuracy of an output digital signal. However, the UDR-ADC implements the signal folding only in the analog-to-digital conversion process, but cannot fold the analog signal in an analog domain.

SUMMARY

This disclosure provides a signal folding method and device, to implement signal folding in an analog domain.

According to a first aspect, an embodiment of this disclosure provides a signal folding method, and the method may be performed by a signal folding device. According to the method, after an input signal is received, frequency modulation may be performed on a plurality of first analog signals based on the input signal to obtain a plurality of modulated first analog signals, where a frequency difference between two adjacent first analog signals in the plurality of modulated first analog signals is the same. Further, the plurality of modulated first analog signals may be filtered based on a specified bandwidth to obtain a second analog signal, and the second analog signal is demodulated to obtain an output signal. The output signal is a folded signal of the input signal within a target amplitude, and the second analog signal is an analog signal within the bandwidth. The bandwidth corresponds to the frequency difference, and the target amplitude corresponds to the bandwidth.

According to the method, the signal folding device can implement signal folding in an analog domain by sequentially performing frequency modulation, bandpass filtering, and frequency demodulation, so that an amplitude range of an analog signal can be extended, and a manner of implementing the signal folding is simple and fast. In addition, compared with a signal folding manner of converting the analog signal into a digital signal, the method can reduce errors in a process of converting the analog signal into the digital signal, and improve accuracy in a signal folding process.

In a possible implementation, the frequency difference is determined based on the target amplitude, and there is a correspondence between the frequency difference, the target amplitude, and the bandwidth. For example, the frequency difference is the same as the bandwidth, and the frequency difference and the bandwidth may be determined by the target amplitude.

According to the method, the frequency difference and the bandwidth are determined based on the target amplitude, so that the output signal can be within the target amplitude, and signal folding accuracy is ensured.

In a possible implementation, the plurality of first analog signals and the second analog signal are optical signals, and the output signal is an electrical signal. When demodulating the second analog signal, the signal folding device may first demodulate the second analog signal to generate a first candidate optical signal, and then perform optical-to-electrical conversion on the first candidate optical signal to convert the optical signal into an electrical signal, to generate the output signal.

According to the method, when the signal folding device performs signal folding, operations performed by the signal folding device, such as the modulation, the filtering, and the demodulation, are all completed in an optical domain. In other words, the optical signals are processed, and optical-to-electrical conversion only needs to be performed on the first candidate optical signal in the end to obtain the output signal. In view of a wide bandwidth (a wide spectrum width) of the optical signal, the signal folding device can process a signal with a relatively high frequency, so that a frequency range of a signal that can be processed is extended.

In a possible implementation, if the plurality of first analog signals are optical signals, the second analog signal is an optical signal, and the output signal is an electrical signal, when demodulating the second analog signal, the signal folding device may first perform frequency reduction processing on the second analog signal, to reduce a frequency of the second analog signal, to obtain a frequency-reduced second analog signal, where a frequency of the frequency-reduced second analog signal is lower than a frequency of the second analog signal, and the frequency-reduced second analog signal is an electrical signal; and then demodulate the frequency-reduced second analog signal to obtain the output signal.

According to the method, when the signal folding device performs signal folding, the modulation and filtering operations are completed in an optical domain. When demodulation is performed, frequency reduction processing is performed, so that the frequency of the second analog signal can be reduced, and the frequency-reduced second analog signal whose type is an electrical signal is also obtained. Then, the frequency-reduced second analog signal is demodulated in an electrical domain, so that demodulation difficulty can be effectively reduced, and efficiency of the entire signal folding process can be ensured.

In a possible implementation, when performing frequency reduction processing on the second analog signal, the signal folding device may first beat the second analog signal and a second reference optical signal to generate a second candidate optical signal, where a frequency of the second reference optical signal may be predetermined; and then perform optical-to-electrical conversion on the second candidate optical signal to obtain the frequency-reduced second analog signal.

According to the method, the second analog signal and the second reference optical signal with the known frequency are beaten, so that the second candidate optical signal whose frequency is equal to a frequency difference between the second reference optical signal and the second analog signal can be conveniently and quickly generated. Then, optical-to-electrical conversion may be performed to obtain the frequency-reduced second analog signal. This frequency reduction processing process is relatively fast and efficient, has low implementation difficulty, and can effectively improve signal folding efficiency.

In a possible implementation, if the plurality of first analog signals are optical signals, and the modulated first analog signal is an electrical signal, when performing frequency modulation on the plurality of first analog signals based on the input signal, the signal folding device may first perform frequency modulation on the plurality of first analog signals based on the input signal to obtain a plurality of first intermediate signals, where the plurality of first intermediate signals are optical signals; and then perform frequency reduction processing on the plurality of first intermediate signals to obtain the plurality of modulated first analog signals, where frequencies of the plurality of modulated first analog signals are lower than frequencies of the plurality of first intermediate signals.

According to the method, during signal folding, when performing frequency modulation, the signal folding device first performs frequency modulation on the plurality of first analog signals in an optical domain, and then performs frequency reduction processing to obtain the plurality of modulated first analog signals whose frequencies are relatively low and whose signal types are electrical signals. Then, both the filtering and demodulation operations performed by the signal folding device are completed in an electrical domain, and a frequency of a signal that needs to be processed is relatively low. This can greatly reduce implementation difficulty of filtering and demodulation, to further ensure high signal folding efficiency.

In a possible implementation, when performing frequency reduction processing on the plurality of first intermediate signals, the signal folding device may beat the plurality of first intermediate signals and a first reference optical signal to generate a plurality of third candidate optical signals, where a frequency of the first reference optical signal may be predetermined; and then perform optical-to-electrical conversion on the plurality of third candidate optical signals to obtain the plurality of modulated first analog signals.

According to the method, the plurality of first intermediate signals and the first reference optical signal with the known frequency are beaten, so that the third candidate optical signals whose frequencies are equal to frequency differences between the first reference optical signal and the first intermediate signals can be more conveniently and quickly generated. Then, optical-to-electrical conversion may be performed to obtain the plurality of modulated first analog signals. This can ensure that the frequencies of the plurality of modulated first analog signals are relatively low and that signal types of the plurality of obtained modulated first analog signals are electrical signals, to facilitate subsequent filtering and demodulation.

In a possible implementation, the input signal, the first analog signal, and the second analog signal are electrical signals.

According to the method, frequency modulation, filtering, and demodulation are performed in the electrical domain, and the signal folding device can accelerate a signal folding speed without performing optical-to-electrical conversion, to ensure high signal folding efficiency.

According to a second aspect, an embodiment of this disclosure further provides a signal folding device. A specific form of the signal folding device is not limited in this embodiment of this disclosure. For example, the signal folding device may be a chip or a device in another form. The device has a function of implementing behavior in the method examples in the first aspect. For beneficial effects, refer to the descriptions of the first aspect. Details are not described herein again. The function may be implemented by hardware, or may be implemented by hardware executing corresponding software. The hardware or software includes one or more modules corresponding to the function. In a possible design, a structure of the device includes a modulation module, a filtering module, and a demodulation module. The modules may perform corresponding functions in the method examples in the first aspect. For details, refer to detailed descriptions in the method examples. Details are not described herein again.

DESCRIPTION OF EMBODIMENTS

Figure 1:
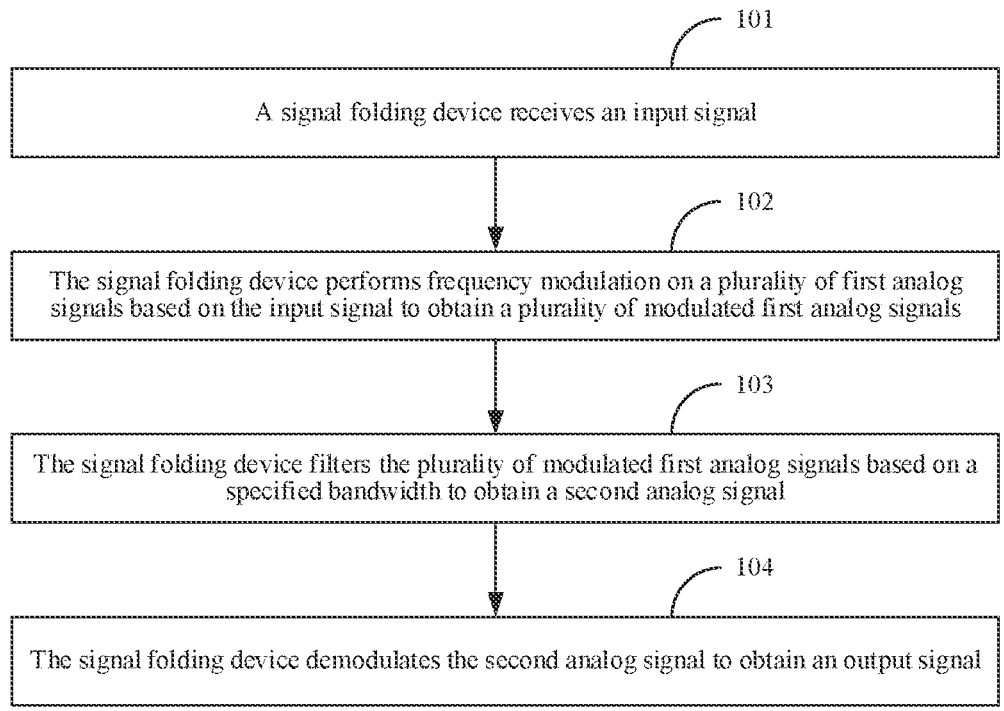
FIG. 1 is a schematic diagram of a signal folding method according to this disclosure.

The following further describes a signal folding method provided in the embodiments of this disclosure. FIG. 1 is a schematic diagram of a signal folding method according to an embodiment of this disclosure. Refer to FIG. 1. The method may include the following steps.

Step 101: A signal folding device receives an input signal. A type of the input signal is not limited in this embodiment of this disclosure, and the input signal may be an electrical signal.

Figure 2A:
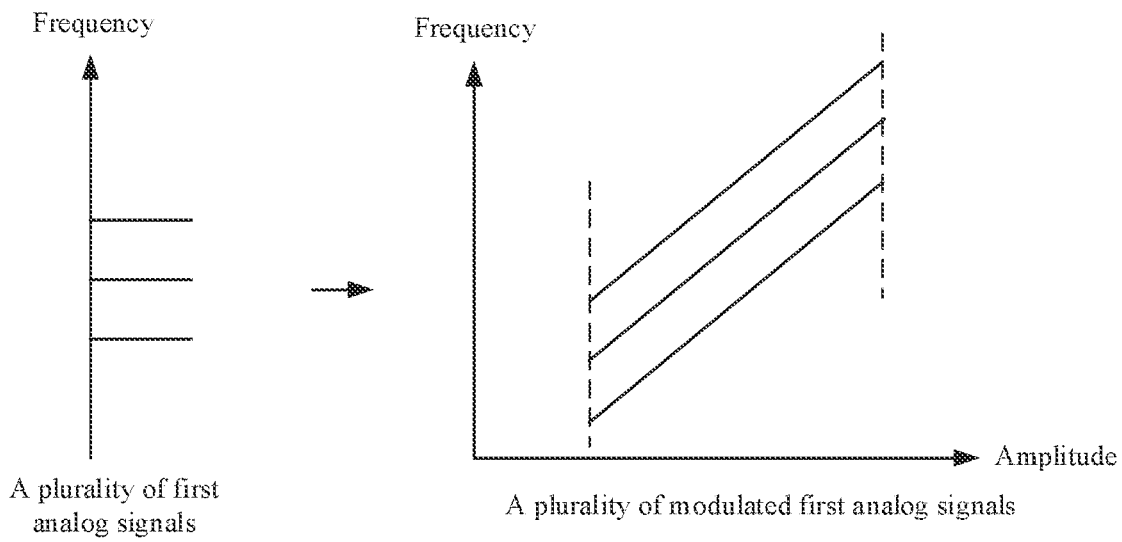
FIG. 2A is a schematic diagram of a plurality of first analog signals and a plurality of modulated first analog signals according to this disclosure.

Step 102: The signal folding device performs frequency modulation on a plurality of first analog signals based on the input signal to obtain a plurality of modulated first analog signals, where a frequency difference between two adjacent first analog signals in the plurality of modulated first analog signals is the same. FIG. 2A is a schematic diagram of the plurality of first analog signals and the plurality of modulated first analog signals. Frequency modulation is performed on the plurality of first analog signals to obtain the plurality of modulated first analog signals corresponding to an amplitude of the input signal.

The plurality of first analog signals are a plurality of analog signals with different frequencies, the plurality of first analog signals are arranged based on the frequencies, and a frequency difference between two adjacent first analog signals is a specified value. In other words, a frequency difference between two first analog signals with closest frequencies is a specified value. Any two adjacent first analog signals have a same frequency difference. In this embodiment of this disclosure, a frequency, of a first analog signal, that is in a median among the frequencies of the plurality of first analog signals is a center frequency of the plurality of first analog signals. In this embodiment of this disclosure, for example, the center frequency of the plurality of first analog signals is $v_0$, and the frequency difference between two adjacent first analog signals is $\Omega$. It may be understood that, in actual application, if the frequency difference between any two adjacent first analog signals is a value within a preset error range of the specified value, it may be considered that the frequency difference between any two adjacent first analog signals is the same. For example, the frequency difference between any two adjacent first analog signals may be $\Omega$ or a value within a preset error range of $\Omega$.

When performing frequency modulation, the signal folding device adjusts the frequencies of the plurality of first analog signals based on the amplitude of the input signal. Because the frequency difference between two adjacent first analog signals in the plurality of first analog signals is the same, after frequency modulation is performed, the frequency difference between two adjacent first analog signals in the plurality of modulated first analog signals does not change, and is also the specified value $\Omega$.

Similarly, a type of the first analog signal is not limited in this embodiment of this disclosure. For example, the first analog signal may be an electrical signal or an optical signal. When the input signal and the first analog signal are of different types, the signal folding device may perform frequency modulation in different manners. For example, the input signal is an electrical signal. The signal folding device may output a plurality of optical signals by using an optical frequency comb source, where the plurality of optical signals may be used as the plurality of first analog signals. The signal folding device loads the input signal onto the optical frequency comb source. The optical frequency comb source can perform frequency modulation on the plurality of optical signals based on the input signal, to obtain a plurality of modulated optical signals. The foregoing manner is merely an example, and a manner in which the signal folding device performs frequency modulation is not limited in this embodiment of this disclosure.

If the first analog signal is an optical signal, when performing step 102, the signal folding device may directly perform frequency modulation on the plurality of first analog signals to obtain a plurality of modulated optical signals, and use the plurality of modulated optical signals as the plurality of modulated first analog signals. Then, the signal folding device may directly perform filtering, that is, perform step 103.

If the first analog signal is an optical signal, when performing step 102, the signal folding device may alternatively perform frequency reduction processing after performing frequency modulation on the plurality of first analog signals, to obtain the plurality of modulated first analog signals, and then perform step 103.

In this embodiment of this disclosure, the frequency reduction processing is used to reduce a frequency of a signal. When the first analog signal is an optical signal, because a frequency of the optical signal is usually relatively high, the frequency of the modulated first analog signal may be appropriately reduced through frequency reduction processing. In addition, signal types of the plurality of finally obtained modulated first analog signals are electrical signals, so that subsequent execution of step 103 and step 104 may be implemented in an electrical domain with a relatively low frequency. This reduces filtering and demodulation difficulty, thereby more easily implementing signal folding.

The following describes a manner in which the signal folding device first performs frequency modulation on the plurality of first analog signals, and then performs frequency reduction processing.

The signal folding device may first perform frequency modulation on the plurality of first analog signals based on the input signal to obtain a plurality of first intermediate signals, where the plurality of first intermediate signals are optical signals. To reduce frequencies of the plurality of first intermediate signals, the signal folding device performs frequency reduction processing on the plurality of first intermediate signals to obtain the plurality of modulated first analog signals. The frequencies of the plurality of modulated first analog signals are lower than the frequencies of the plurality of first intermediate signals, and the plurality of modulated first analog signals are electrical signals.

A manner of performing frequency reduction processing on the plurality of first intermediate signals is not limited in this embodiment of this disclosure. The following describes a manner of performing frequency reduction processing on the plurality of first intermediate signals.

The signal folding device may beat the plurality of first intermediate signals and a first reference optical signal to generate a plurality of third candidate optical signals. A beat frequency may also be referred to as a difference frequency. The beating means that two signals with different frequencies are used to interfere with each other to output a new signal, where a frequency of the new signal is equal to a frequency difference between the two signals with the different frequencies. The plurality of third candidate optical signals can be more quickly and conveniently obtained in a beating manner, and frequencies of the third candidate optical signal can also be better controlled in the beating manner.

For each first intermediate signal, the signal folding device beats the first intermediate signal and the first reference optical signal to generate one third candidate optical signal. A frequency of the third candidate optical signal is less than the frequency of the first intermediate signal, and is equal to a frequency difference between the first intermediate signal and the first reference optical signal.

Then, the signal folding device performs optical-to-electrical conversion on the plurality of third candidate optical signals to obtain the plurality of modulated first analog signals. The optical-to-electrical conversion is performed on the plurality of third candidate optical signals to generate the plurality of modulated first analog signals whose signal types are electrical signals, so that the signal folding device can simply and efficiently implement filtering and demodulation in the electrical domain subsequently.

Figure 2B:
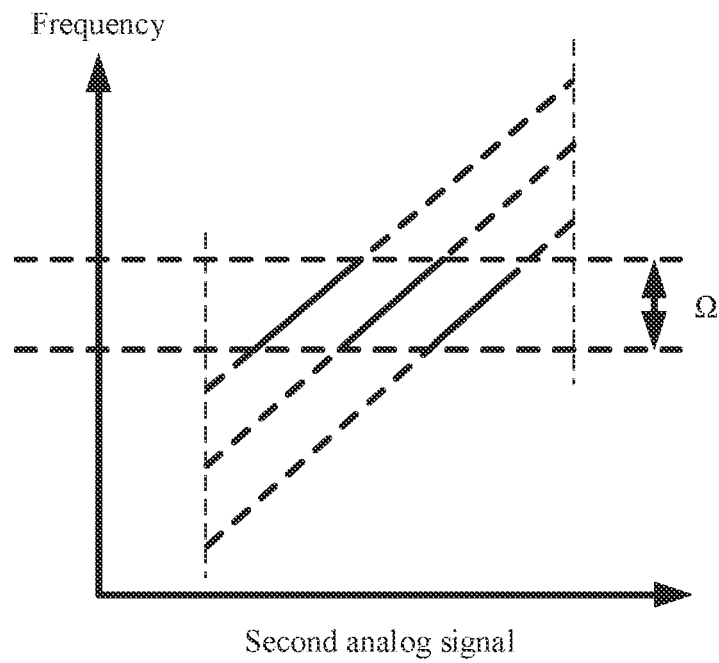
FIG. 2B is a schematic diagram of a second analog signal according to this disclosure.

Step 103: The signal folding device filters the plurality of modulated first analog signals based on a specified bandwidth to obtain a second analog signal, where the second analog signal is an analog signal within the bandwidth, and the bandwidth corresponds to the frequency difference. The plurality of modulated first analog signals may be the plurality of modulated first analog signals directly output in step 102 or the plurality of modulated first analog signals obtained by performing frequency reduction processing on the plurality of first intermediate signals. FIG. 2B is a schematic diagram of the plurality of first analog signals and the second analog signal.

When performing step 103, the signal folding device obtains only a signal in the plurality of modulated first analog signals that is within the bandwidth, and the signal in the plurality of modulated first analog signals that is within the bandwidth is the second analog signal. A frequency range of the plurality of modulated first analog signals may be reduced through filtering.

In this embodiment of this disclosure, the bandwidth corresponds to the frequency difference. For example, the bandwidth may be equal to the frequency difference, or the bandwidth may be equal to a sum of the frequency difference and an offset. The offset may be a value set based on an application scenario, or may be an empirical value. A specific form of a correspondence between the bandwidth and the frequency difference is not limited in this embodiment of this disclosure. The bandwidth herein refers to a difference between an upper frequency limit and a lower frequency limit when the signal folding device performs filtering. When the signal folding device performs filtering, a filtering center frequency may be the same as the center frequency of the plurality of first analog signals before modulation, or may be different from the center frequency of the plurality of first analog signals before modulation. A specific value of the filtering center frequency is not limited in this embodiment of this disclosure.

If the plurality of modulated first analog signals are optical signals, the second analog signal is also an optical signal. If the plurality of modulated first analog signals are electrical signals, the second analog signal is also an electrical signal.

Figure 2C:
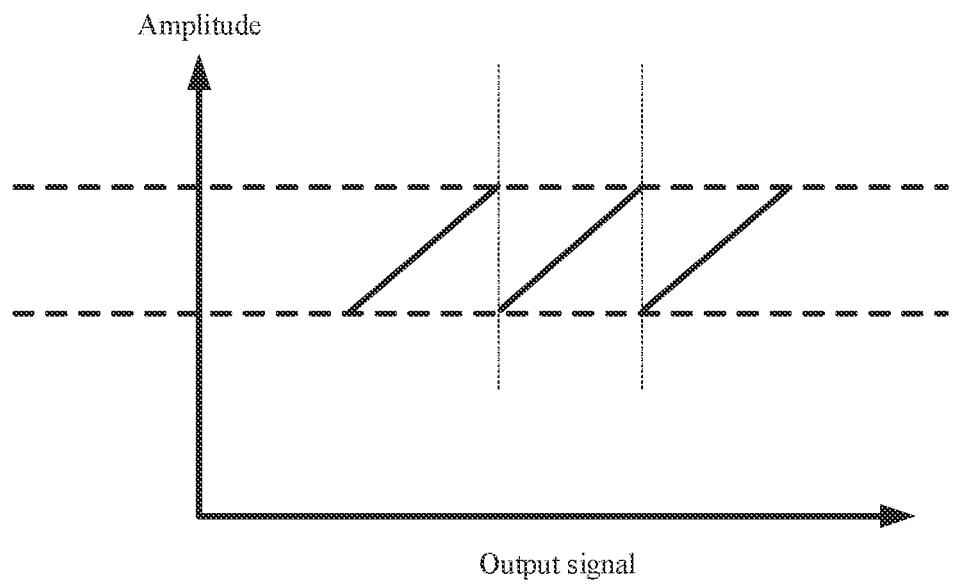
FIG. 2C is a schematic diagram of an output signal according to this disclosure.

Step 104: The signal folding device demodulates the second analog signal to obtain an output signal, where the output signal is a folded signal of the input signal within a target amplitude, and the target amplitude corresponds to the bandwidth. FIG. 2C is a schematic diagram of the output signal.

In this embodiment of this disclosure, the bandwidth corresponds to the target amplitude. There is a correspondence between the target amplitude, the bandwidth, and the frequency difference in the foregoing descriptions, and the bandwidth or the frequency difference may be determined based on the target amplitude.

The following further describes the correspondence between the target amplitude, the bandwidth, and the frequency difference that is between two adjacent first analog signals.

When it is determined that signal folding needs to be performed on the input signal, the target amplitude may be predetermined. In other words, an amplitude range obtained after signal folding is performed on the input signal is determined. A manner of determining the target amplitude and a specific value of the target amplitude are not limited in this embodiment of this disclosure, and may be set based on a requirement of an application scenario.

After a target amplitude $\Delta V$ is determined, a frequency difference $\Delta v$ between two adjacent first analog signals may be determined. A relationship between the target amplitude and the frequency difference is as follows:

$$\Delta v = \alpha \Delta V$$

$\alpha$ is a modulation coefficient, and $\alpha$ is related to a feature of the signal folding device. The foregoing specific form of the correspondence between the target amplitude and the frequency difference is merely an example. A specific form of the correspondence between the bandwidth, the frequency difference, and the target amplitude is not limited in this embodiment of this disclosure.

When performing step 104, the signal folding device converts a frequency of the second analog signal into an amplitude of the output signal. A type of the output signal is not limited herein. The type of the input signal may be the same as the type of the output signal. If the input signal is an electrical signal, the output signal is also an electrical signal.

If the second analog signal is an optical signal, and the output signal is an electrical signal, the signal folding device may perform step 104 in the following two manners.

Manner 1: Demodulation is first performed, and then optical-to-electrical conversion is performed.

The signal folding device may first demodulate the second analog signal to generate a first candidate optical signal, and then perform optical-to-electrical conversion on the first candidate optical signal to generate the output signal.

In this manner, the signal folding device performs step 102 and step 103, that is, performs frequency demodulation and filtering on the optical signal in an optical domain; and performs step 104, that is, demodulates the optical signal and finally obtains the output signal through optical-to-electrical conversion. Because the optical signal has an advantage of a wide bandwidth, the signal folding device can process a signal with a relatively high frequency.

Manner 2: Frequency reduction processing is first performed, and then demodulation is performed.

The signal folding device may first perform frequency reduction processing on the second analog signal to obtain a frequency-reduced second analog signal, where a frequency of the frequency-reduced second analog signal is lower than the frequency of the second analog signal, and the frequency-reduced second analog signal is an electrical signal; and then demodulate the frequency-reduced second analog signal to obtain the output signal.

In other words, when performing demodulation, the signal folding device may first implement frequency reduction and signal type conversion (conversion from an optical signal to an electrical signal) through the frequency reduction processing, and then can more easily demodulate the frequency-reduced second analog signal in the electrical domain. This improves signal demodulation efficiency.

A manner in which the signal folding device performs frequency reduction processing on the second analog signal is similar to a manner in which the signal folding device performs frequency reduction processing on the plurality of first intermediate signals. The signal folding device may beat the second analog signal and a second reference optical signal to generate a second candidate optical signal. A frequency of the second candidate optical signal is less than the frequency of the first analog signal, and is equal to a frequency difference between the second analog signal and the second reference optical signal. Then, the signal folding device performs optical-to-electrical conversion on the second candidate optical signal to obtain the frequency-reduced second analog signal. In the beating manner, the second candidate optical signal can be conveniently generated, and then the frequency-reduced second analog signal can be obtained through the optical-to-electrical conversion. The entire process is simple and fast.

Optionally, the input signal, the first analog signal, and the second analog signal may alternatively be electrical signals. In this case, when performing signal folding on the input signal, the signal folding device does not need to perform optical-to-electrical conversion, and may obtain the output signal through the frequency modulation, bandpass filtering, and demodulation. In this way, signal folding efficiency can be effectively improved.

Figure 3:
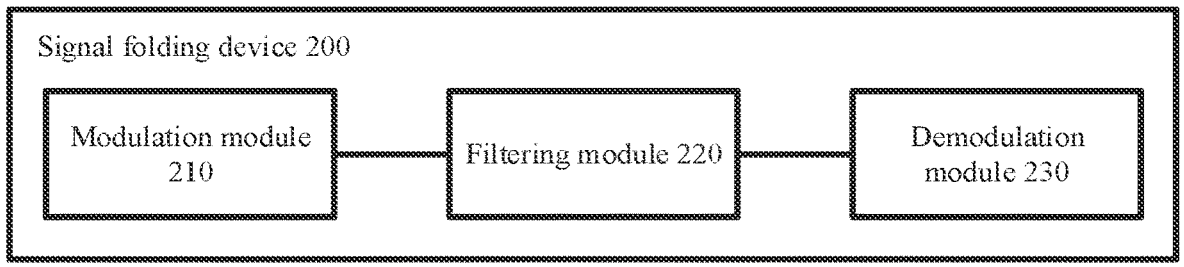
FIG. 3 is a schematic diagram of a structure of a signal folding device according to this disclosure.

Based on a same concept as that of the method embodiment, an embodiment of this disclosure further provides a signal folding device, configured to perform the method performed by the signal folding device in the foregoing embodiment. For a related feature, refer to the foregoing method embodiment. Details are not described herein again. As shown in FIG. 3, a signal folding device 200 includes a modulation module 210, a filtering module 220, and a demodulation module 230.

The modulation module 210 is configured to receive an input signal, and perform frequency modulation on a plurality of first analog signals based on the input signal to obtain a plurality of modulated first analog signals, where a frequency difference between two adjacent first analog signals in the plurality of modulated first analog signals is the same. As described above, it may be understood that, in actual application, if the frequency difference between two adjacent first analog signals is a value within a preset error range of a specified value, it may be considered that the frequency difference between two adjacent first analog signals is the same. For example, the frequency difference between two adjacent first analog signals may be Ω or a value within a preset error range of a Ω.

The filtering module 220 is configured to filter the plurality of modulated first analog signals based on a specified bandwidth to obtain a second analog signal, where the second analog signal is an analog signal within the bandwidth, and the bandwidth corresponds to the frequency difference. The filtering module 220 may be an optical filter including a fiber Bragg grating, a cascaded Mach-Zehnder interferometer (MZI), or a cascaded microring, or may be an electrical filter. When the plurality of modulated first analog signals are optical signals, the filtering module 220 may be an optical filter. When the plurality of modulated first analog signals are electrical signals, the filtering module 220 may be an electrical filter.

The demodulation module 230 is configured to demodulate the second analog signal to obtain an output signal, where the output signal is a folded signal of the input signal within a target amplitude, and the target amplitude corresponds to the bandwidth.

The frequency difference is determined based on the target amplitude. For a correspondence between the bandwidth, the frequency difference, and the target amplitude, refer to the foregoing content. Details are not described herein again.

Figure 4:
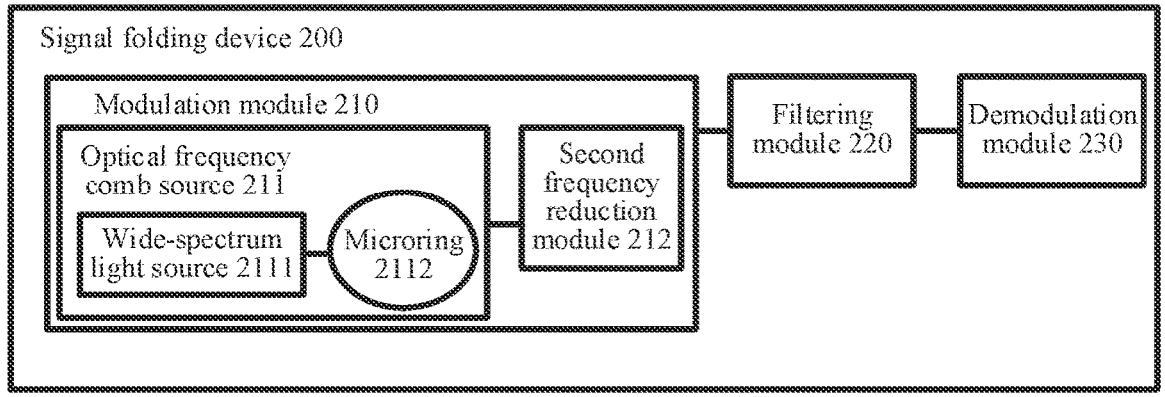
FIG. 4 is a schematic diagram of a structure of a modulation module according to this disclosure.

A structure of the modulation module is not limited in this embodiment of this disclosure. FIG. 4 shows a modulation module according to an embodiment of this disclosure. The modulation module 210 includes an optical frequency comb source 211 and a second frequency reduction module 212. The optical frequency comb source 211 can output the plurality of first analog signals, and may further perform frequency modulation on the plurality of first analog signals based on the input signal to obtain a plurality of first intermediate signals.

Refer to FIG. 4. The optical frequency comb source 211 includes a wide-spectrum light source 2111 and a microring 2112, and the microring 2112 is covered with a thin film material. The microring 2112 can output the plurality of first analog signals based on light output by the wide-spectrum light source 2111. The input signal may be loaded on electrodes on both sides of the thin film material, and the input signal can change an optical path of the microring 2112 by changing an effective refractive index of the thin film material, to modulate frequencies of the plurality of first analog signals output by the microring 2112. A frequency of transmitted light linearly transforms with an amplitude of the input signal (where the input signal is an electrical signal, and an amplitude of the electrical signal is a voltage of the electrical signal). The microring 2112 may be prepared from silicon nitride, or the like, and the thin film material may be an electro-optic material, a phase change material, a thermo-optic material, or the like.

Optionally, if frequencies of the plurality of first intermediate signals output by the optical frequency comb source 211 are relatively high, the second frequency reduction module 212 can perform frequency reduction processing on the frequencies of the plurality of first intermediate signals.

Refer to FIG. 4. The modulation module 210 further includes the second frequency reduction module 212. The second frequency reduction module 212 may be located between the optical frequency comb source 211 and the filtering module 220. The second frequency reduction module 212 can perform frequency reduction processing on signals output by the optical frequency comb source 211, namely, the plurality of first intermediate signals, to obtain the plurality of modulated first analog signals, and then send the plurality of modulated first analog signals to the filtering module 220. The filtering module 220 may filter the plurality of modulated first analog signals based on the specified bandwidth to obtain the second analog signal.

When the modulation module 210 performs frequency modulation, the optical frequency comb source 211 may first perform frequency modulation on the plurality of first analog signals in an optical domain. Then, the second frequency reduction module 212 performs frequency reduction processing on the plurality of first intermediate signals output by the optical frequency comb source 211, to obtain the plurality of modulated first analog signals whose frequencies are relatively low and whose signal types are electrical signals. Then, filtering and demodulation operations are both subsequently performed in an electrical domain, and a frequency of a signal that needs to be processed is relatively low. This can greatly reduce difficulties of subsequent filtering performed by the filtering module 220 and subsequent demodulation performed by the demodulation module 230.

A manner in which the second frequency reduction module 212 performs frequency reduction processing on the plurality of modulated first analog signals and a structure of the second frequency reduction module 212 are not limited in this embodiment of this disclosure. The structure of the second frequency reduction module 212 may vary with the manner in which the second frequency reduction module 212 performs frequency reduction processing.

Figure 5:
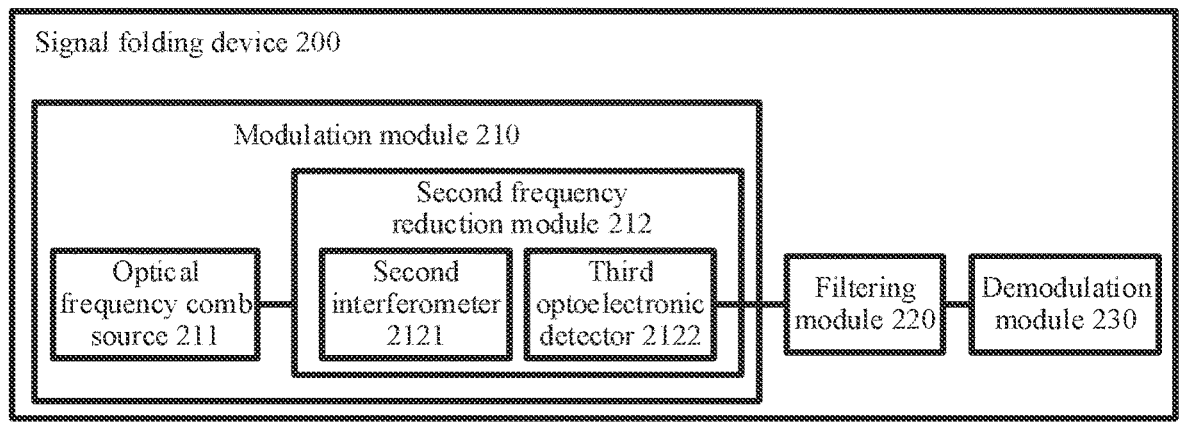
FIG. 5 is a schematic diagram of a structure of a second frequency reduction module according to this disclosure.

The following describes a structure of a second frequency reduction module. Refer to FIG. 5. The second frequency reduction module 212 includes a second interferometer 2121 and a third optoelectronic detector 2122.

The second interferometer 2121 is configured to beat the plurality of first intermediate signals and a first reference optical signal to generate a plurality of third candidate optical signals. The second interferometer 2121 can quickly obtain the plurality of third candidate optical signals in a beating manner, and a frequency of the third candidate optical signal can be better controlled in the beating manner. This can reduce frequency reduction processing difficulty.

The third optoelectronic detector 2122 is configured to perform optical-to-electrical conversion on the plurality of third candidate optical signals to convert the plurality of third candidate optical signals into electrical signals, to obtain a plurality of modulated first analog signals.

Certainly, the modulation module 210 may alternatively not include the second frequency reduction module 212. In this case, the signals (for example, the plurality of first intermediate signals) output by the optical frequency comb source 211 are the plurality of modulated first analog signals. The plurality of modulated first analog signals output by the optical frequency comb source 211 may be output to the filtering module 220.

Optionally, if the second analog signal output by the filtering module 220 is an optical signal, and a frequency of the second analog signal is relatively high, the demodulation module 230 may alternatively first perform frequency reduction processing on the second analog signal, and then demodulate a frequency-reduced second analog signal to obtain the output signal. The output signal is an electrical signal.

Figure 6:
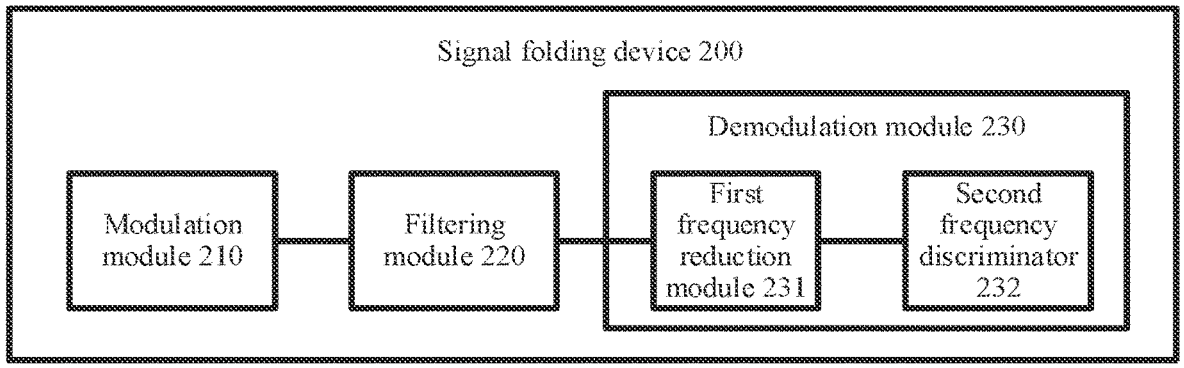
FIG. 6 is a schematic diagram of a structure of a demodulation module according to this disclosure.

Refer to FIG. 6. The demodulation module 230 includes a first frequency reduction module 231 and a second frequency discriminator 232. The first frequency reduction module 231 may be located between the filtering module 220 and the second frequency discriminator 232. The first frequency reduction module 231 may perform frequency reduction processing on a signal output by the filtering module 220, namely, the second analog signal, and then output the frequency-reduced second analog signal to the second frequency discriminator 232. The frequency-reduced second analog signal is an electrical signal. Then, the second frequency discriminator 232 may demodulate the frequency-reduced second analog signal, to obtain the output signal.

When the demodulation module 230 performs demodulation, through frequency reduction processing, the first frequency reduction module 231 reduces the frequency of the second analog signal, and also obtains the frequency-reduced second analog signal whose type is an electrical signal. Then, the second frequency discriminator 232 can more conveniently demodulate the frequency-reduced second analog signal in the electrical domain. This reduces demodulation difficulty, and ensures signal folding efficiency.

A manner in which the first frequency reduction module 231 performs frequency reduction processing on the second analog signal and a structure of the first frequency reduction module 231 are not limited in this embodiment of this disclosure. The structure of the first frequency reduction module 231 may vary with the manner in which the first frequency reduction module 231 performs frequency reduction processing.

Figure 7:
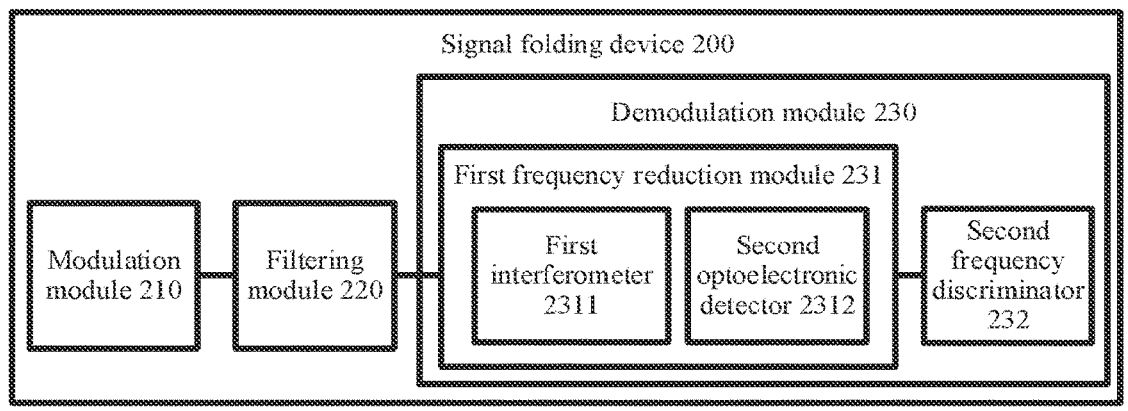
FIG. 7 is a schematic diagram of a structure of a first frequency reduction module according to this disclosure.

The following describes a structure of a first frequency reduction module. Refer to FIG. 7. The first frequency reduction module 231 includes a first interferometer 2311 and a second optoelectronic detector 2312.

The first interferometer 2311 is configured to beat the second analog signal and a second reference optical signal to generate a second candidate optical signal. The first interferometer 2311 can quickly obtain a plurality of second candidate optical signals in a beating manner, and a frequency of the second candidate optical signal can be better controlled in the beating manner. This ensures frequency reduction processing feasibility.

The second optoelectronic detector 2312 is configured to perform optical-to-electrical conversion on the second candidate optical signal to obtain the frequency-reduced second analog signal.

Alternatively, the demodulation module 230 may directly demodulate the second analog signal, and then perform optical-to-electrical conversion on a demodulated second analog signal (where the demodulated second analog signal is an optical signal, and is referred to as a first candidate optical signal herein for ease of description) to obtain the output signal. The output signal is an electrical signal.

In this way, when the signal folding device performs signal folding, the modulation operation performed by the demodulation module 210, the filtering operation performed by the filtering module 220, and the demodulation operation performed by the demodulation module 230 are all completed in the optical domain. In other words, the optical signals are processed. The demodulation module 230 only needs to perform optical-to-electrical conversion on the first candidate optical signal in the end to obtain the output signal. Because the optical signal has a feature of wide bandwidth, the signal folding device can process a signal with a relatively high frequency, to extend a frequency range of a signal that can be processed.

Figure 8:
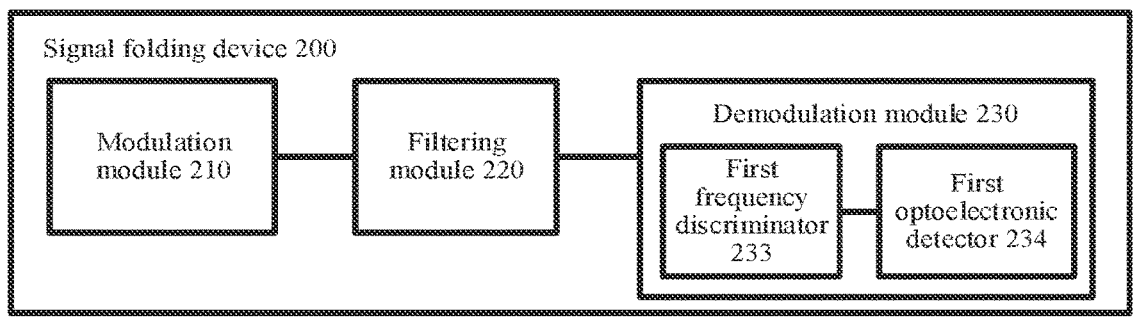
FIG. 8 is a schematic diagram of a structure of a demodulation module according to this disclosure.

As shown in FIG. 8, the demodulation module 230 may include a first frequency discriminator 233 and a first optoelectronic detector 234. A type of the first frequency discriminator 233 is not limited in this embodiment of this disclosure.

The first frequency discriminator 233 is configured to demodulate the second analog signal to generate the first candidate optical signal.

The first optoelectronic detector 234 is configured to perform optical-to-electrical conversion on the first candidate optical signal to generate the output signal.

In a possible implementation, the input signal, the first analog signal, and the second analog signal are electrical signals. The modulation module 210 performs frequency modulation in the electrical domain, the filtering module 220 performs filtering in the electrical domain, and the demodulation module 230 performs demodulation in the electrical domain. Optical-to-electrical conversion is not required in a signal folding process, so that the signal folding efficiency can be effectively ensured, and costs of the signal folding device can be reduced.

It should be noted that the embodiments provided in this disclosure are merely examples. A person skilled in the art may clearly know that, for convenience and conciseness of description, in the foregoing embodiments, the embodiments emphasize different aspects, and for a part not described in detail in one embodiment, refer to related descriptions in another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

What is claimed is:

1. A signal folding method, comprising:
receiving an input signal; and
performing signal folding in an analog domain, wherein performing the signal folding comprises:
performing, based on the input signal, frequency modulation on a first plurality of first analog signals to obtain a second plurality of modulated first analog signals, wherein a frequency difference between two adjacent modulated first analog signals is the same;
filtering, based on a bandwidth, the second plurality to obtain a second analog signal, wherein the first plurality and the second analog signal are optical signals, wherein the second analog signal is within the bandwidth, and wherein the bandwidth corresponds to the frequency difference; and
demodulating the second analog signal to obtain an output signal, wherein the output signal is a first electrical signal and is a folded signal of the input signal within a target amplitude, wherein the target amplitude corresponds to the bandwidth, and wherein demodulating the second analog signal comprises:
performing frequency reduction processing on the second analog signal to obtain a frequency-reduced second analog signal, wherein a first frequency of the frequency-reduced second analog signal is lower than a second frequency of the second analog signal, and wherein the frequency-reduced second analog signal is a second electrical signal; and
demodulating the frequency-reduced second analog signal to obtain the output signal.

2. The signal folding method of claim 1, further comprising determining, based on the target amplitude, the frequency difference.

3. The signal folding method of claim 1, wherein performing the frequency reduction processing comprises:
beating the second analog signal and a second reference optical signal to generate a second candidate optical signal; and
performing optical-to-electrical conversion on the second candidate optical signal to obtain the frequency-reduced second analog signal.

4. The signal folding method of claim 1, wherein the first analog signals are optical signals, wherein the modulated first analog signals are first electrical signals, and wherein performing the frequency modulation comprises:
performing, based on the input signal, frequency modulation on the first plurality to obtain a third plurality of first intermediate signals, wherein the first intermediate signals are optical signals; and
performing frequency reduction processing on the third plurality to obtain the second plurality,
wherein first frequencies of the second plurality are lower than second frequencies of the third plurality, and
wherein the modulated first analog signals are second electrical signals.

5. The signal folding method of claim 4, wherein performing frequency reduction processing on the third plurality comprises:
beating the third plurality and a first reference optical signal to generate a fourth plurality of third candidate optical signals; and
performing optical-to-electrical conversion on the fourth plurality to obtain the second plurality.

6. The signal folding method of claim 1, wherein the input signal, the first analog signals, and the second analog signal are electrical signals.

7. A signal folding device, comprising:
a memory configured to store instructions; and
a processor coupled to the memory and configured to execute the instructions to:
receive an input signal; and
perform signal folding in an analog domain, wherein performing the signal folding comprises:
performing, based on the input signal, frequency modulation on a first plurality of first analog signals to obtain a second plurality of modulated first analog signals, wherein a frequency difference between two adjacent modulated first analog signals is the same;
filtering, based on a bandwidth, the second plurality to obtain a second analog signal, wherein the first plurality and the second analog signal are optical signals, wherein the second analog signal is within the bandwidth, and wherein the bandwidth corresponds to the frequency difference; and
demodulating the second analog signal to obtain an output signal, wherein the output signal is a first electrical signal and is a folded signal of the input signal within a target amplitude, wherein the target amplitude corresponds to the bandwidth, and wherein demodulating the second analog signal comprises:
performing frequency reduction processing on the second analog signal to obtain a frequency-reduced second analog signal, wherein a first frequency of the frequency-reduced second analog signal is lower than a second frequency of the second analog signal, and wherein the frequency-reduced second analog signal is a second electrical signal; and
demodulating the frequency-reduced second analog signal to obtain the output signal.

8. The signal folding device of claim 7, wherein the processor is further configured to execute the instructions to determine, based on the target amplitude, the frequency difference.

9. The signal folding device of claim 7, wherein the processor is further configured to execute the instructions to:
beat the second analog signal and a second reference optical signal to generate a second candidate optical signal; and
perform optical-to-electrical conversion on the second candidate optical signal to obtain the frequency-reduced second analog signal.

10. The signal folding device of claim 7, wherein the first analog signals are optical signals, wherein the modulated first analog signals are first electrical signals, and wherein the processor is further configured to execute the instructions to:
perform, based on the input signal, frequency modulation on the first plurality to obtain a third plurality of first intermediate signals, wherein the first intermediate signals are optical signals; and
perform frequency reduction processing on the third plurality to obtain the second plurality,
wherein first frequencies of the second plurality are lower than second frequencies of the third plurality, and
wherein the modulated first analog signals are second electrical signals.

11. The signal folding device of claim 10, wherein the processor is further configured to execute the instructions to:
beat the third plurality and a first reference optical signal to generate a fourth plurality of third candidate optical signals; and
perform optical-to-electrical conversion on the fourth plurality to obtain the second plurality.

12. The signal folding device of claim 7, wherein the input signal, the first analog signals, and the second analog signal are electrical signals.

13. The signal folding device of claim 7, further comprising a filter, wherein the filter comprises a fiber Bragg grating.

14. The signal folding device of claim 7, further comprising a filter, wherein the filter comprises a cascaded Mach-Zehnder interferometer (MZI).

15. The signal folding device of claim 7, further comprising a filter, wherein the filter comprises a cascaded microring or an electrical filter.

16. A computer program product comprising instructions stored on a non-transitory computer-readable medium that, when executed by a processor, cause an electronic device to:
receive an input signal; and
perform signal folding in an analog domain, wherein performing the signal folding comprises:
performing, based on the input signal, frequency modulation on a first plurality of first analog signals to obtain a second plurality of modulated first analog signals, wherein a frequency difference between two adjacent modulated first analog signals is the same;
filtering, based on a bandwidth, the second plurality to obtain a second analog signal, wherein the first plurality and the second analog signal are optical signals, wherein the second analog signal is within the bandwidth, and wherein the bandwidth corresponds to the frequency difference; and
demodulating the second analog signal to obtain an output signal, wherein the output signal is a first electrical signal and is a folded signal of the input signal within a target amplitude, wherein the target amplitude corresponds to the bandwidth, and
wherein demodulating the second analog signal comprises:
performing frequency reduction processing on the second analog signal to obtain a frequency-reduced second analog signal, wherein a first frequency of the frequency-reduced second analog signal is lower than a second frequency of the second analog signal, and wherein the frequency-reduced second analog signal is a second electrical signal; and
demodulating the frequency-reduced second analog signal to obtain the output signal.

17. The computer program product of claim 16, wherein the instructions, when executed by the processor, further cause the electronic device to determine, based on the target amplitude, the frequency difference.

18. The computer program product of claim 16, wherein the instructions, when executed by the processor, further cause the electronic device to:
beat the second analog signal and a second reference optical signal to generate a second candidate optical signal; and
perform optical-to-electrical conversion on the second candidate optical signal to obtain the frequency-reduced second analog signal.

19. The computer program product of claim 16, wherein the first analog signals are optical signals, wherein the modulated first analog signals are first electrical signals, and wherein the instructions, when executed by the processor, further cause the electronic device to:
perform, based on the input signal, frequency modulation on the first plurality to obtain a third plurality of first intermediate signals, wherein the first intermediate signals are optical signals; and
perform frequency reduction processing on the third plurality to obtain the second plurality,
wherein first frequencies of the second plurality are lower than second frequencies of the third plurality, and
wherein the modulated first analog signals are second electrical signals.

20. The computer program product of claim 19, wherein the instructions, when executed by the processor, further cause the electronic device to:
beat the third plurality and a first reference optical signal to generate a fourth plurality of third candidate optical signals; and
perform optical-to-electrical conversion on the fourth plurality to obtain the second plurality.

* * * * *